July 18, 1939.  R. R. MEAD  2,166,170
SLUG-CASTING MACHINE
Original Filed Sept. 18, 1936   3 Sheets-Sheet 1
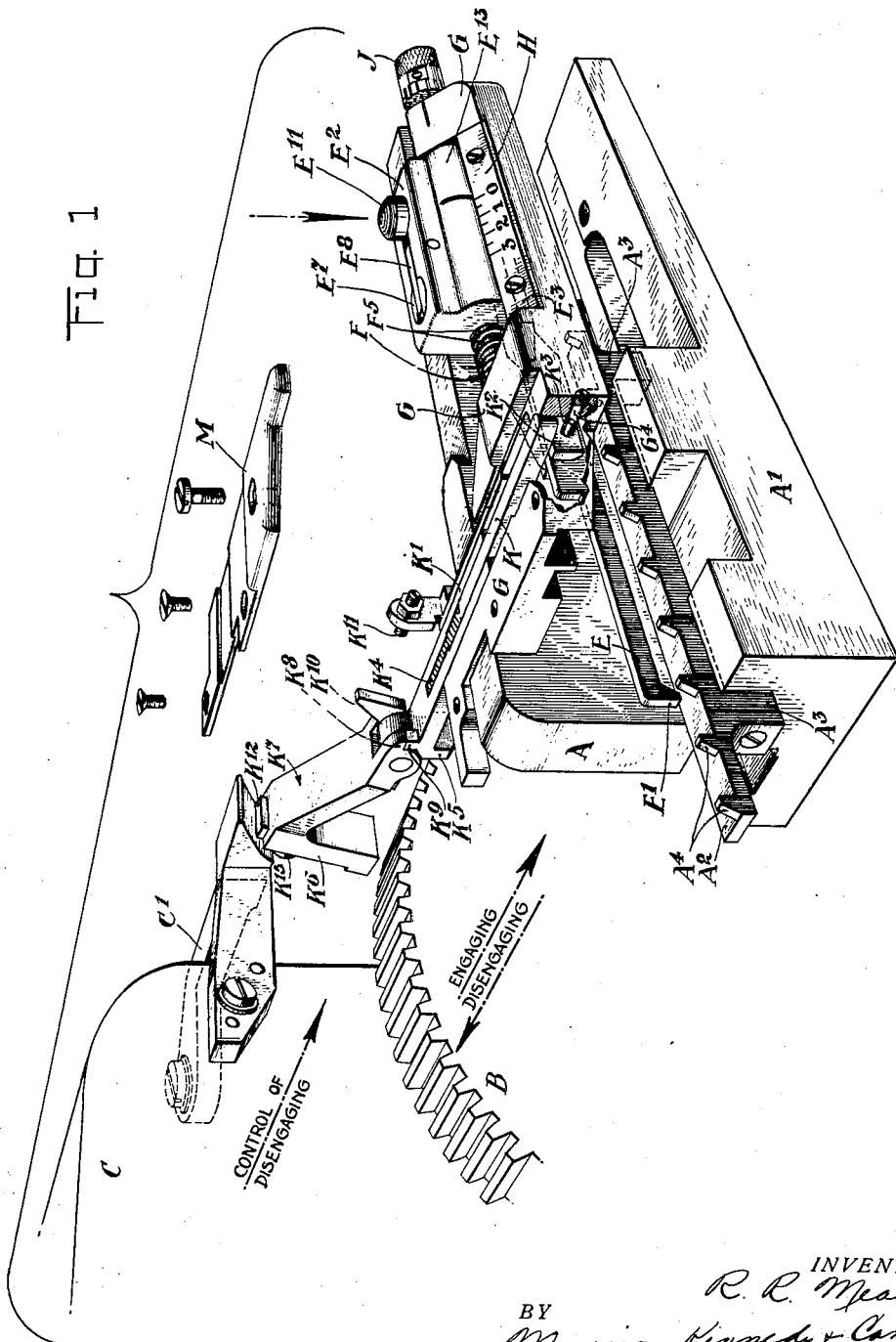
INVENTOR
R. R. Mead
BY
Morrison, Kennedy & Campbell
ATTORNEYS July 18, 1939. R. R. MEAD 2,166,170
SLUG-CASTING MACHINE
Original Filed Sept. 18, 1936 3 Sheets-Sheet 2
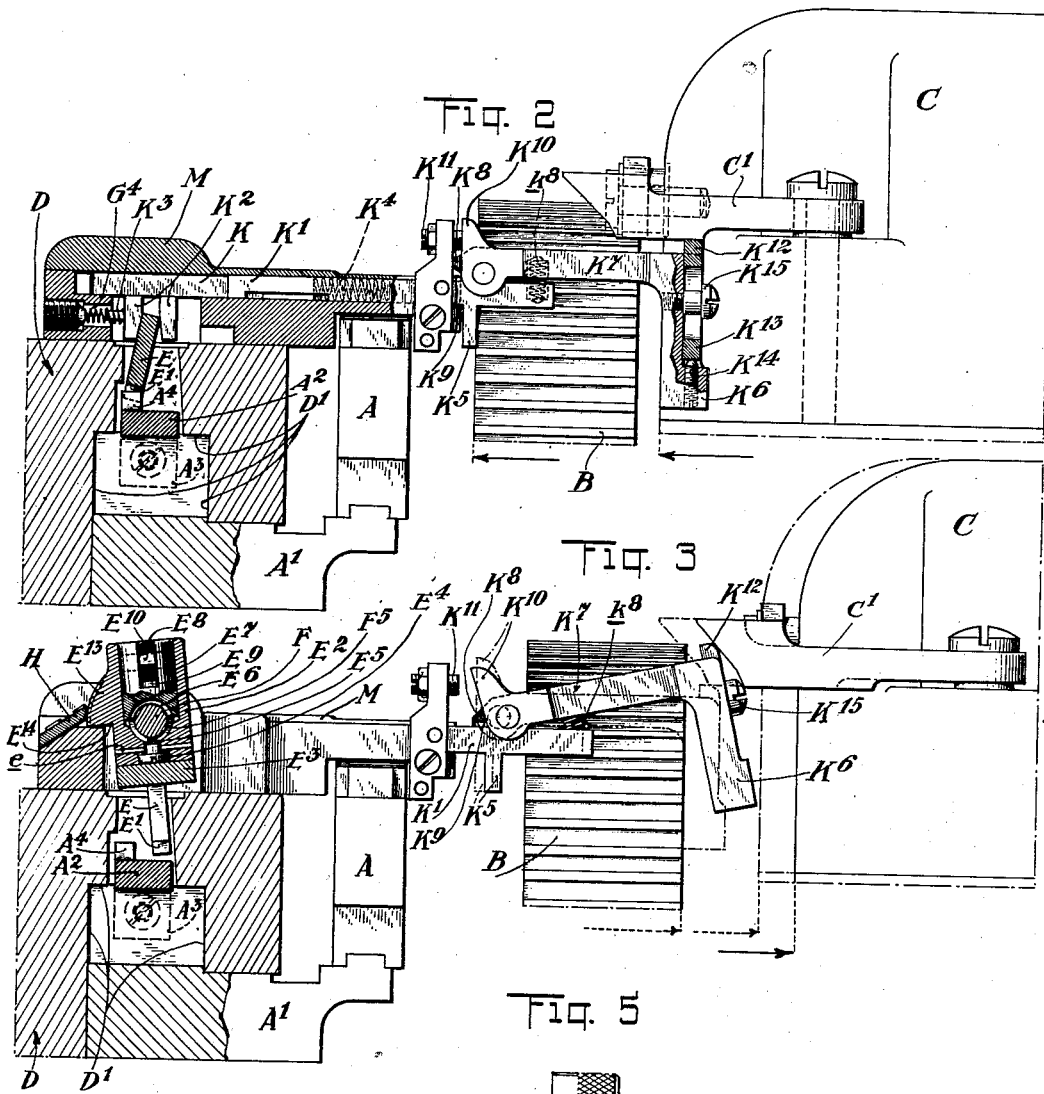
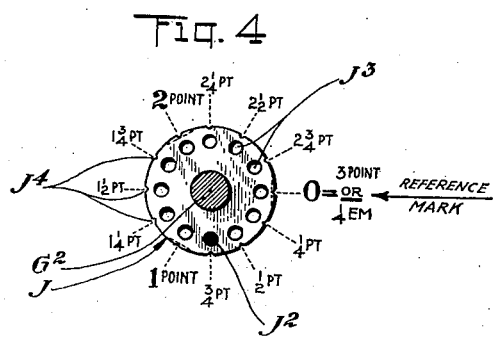
INVENTOR
R. R. Mead
BY Morrison, Kennedy & Campbell
ATTORNEYS July 18, 1939. R. R. MEAD 2,166,170
SLUG-CASTING MACHINE
Original Filed Sept. 18, 1936 3 Sheets-Sheet 3
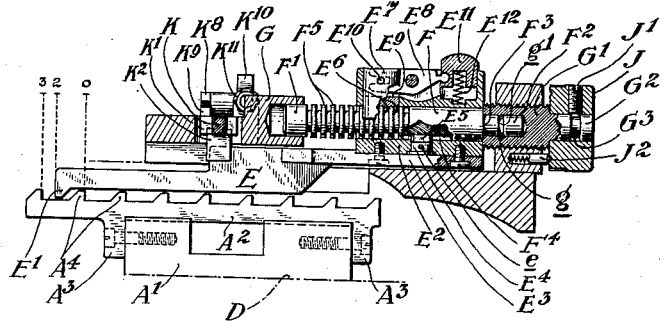
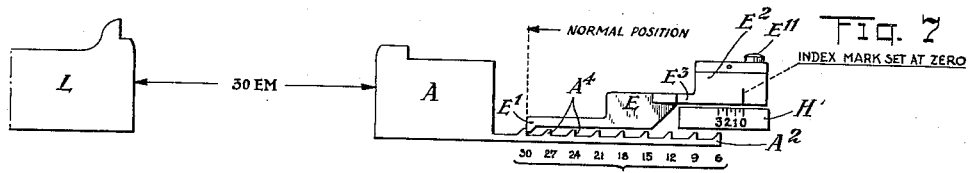
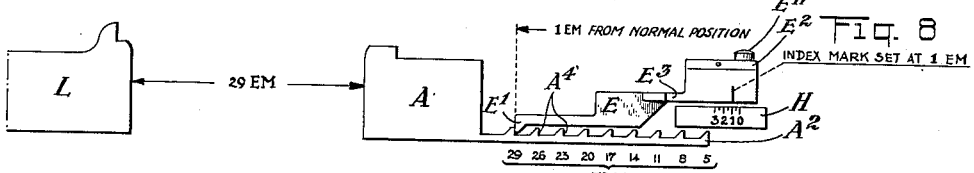
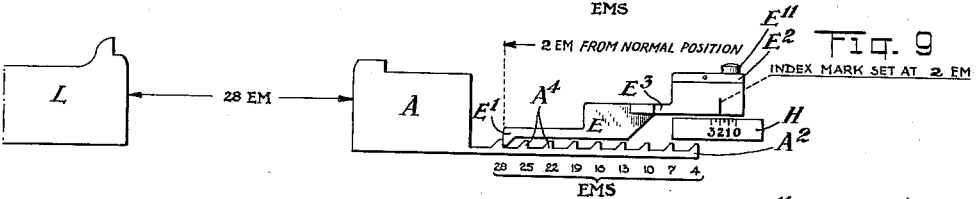
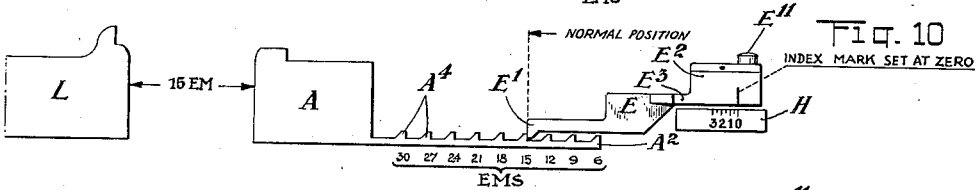
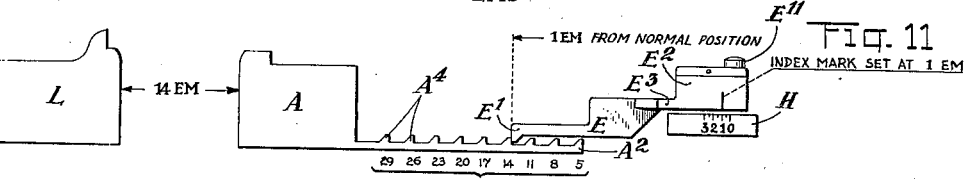
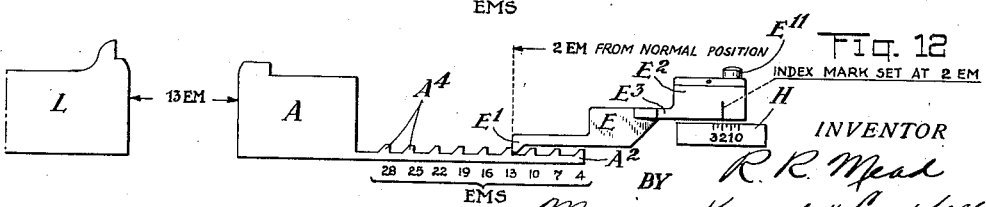
INVENTOR
R. R. Mead
BY Morrison, Kennedy & Campbell
ATTORNEYS Patented July 18, 1939

2,166,170

UNITED STATES PATENT OFFICE 2,166,170

SLUG-CASTING MACHINE

Richard R. Mead, Queens Village, N. Y., assignor to Mergenthaler Linotype Company, a corporation of New York Application September 18, 1936, Serial No. 101,405
Renewed November 10, 1938

32 Claims. (Cl. 199—50)

This invention relates to slug casting machines of the general organization represented in United States Letters Patent to O. Mergenthaler, No. 436,532, wherein circulating matrices and expansible spacebands are composed in line and then transferred to a vertically movable line transporter or first elevator which descends to present the composed line between a pair of line clamping jaws and to the face of a slotted mold, the spacebands driven up through the line to fill out the space between the line clamping jaws, and a slug or "Linotype" thereafter cast against the composed line which closes the slotted mold at the front.

The present improvements are directed to a machine of this class equipped for quadding with one of the line clamping jaws and deal with mechanism for securing a fixed indenture at the corresponding end of the line, such as is necessary for straight line margin work. Specifically, there is provided a banking pawl or element arranged to be engaged during the justification or expansion of the composed line by one or another of a series of locating stops or ratchet teeth fixed on the quadding jaw (the right-hand jaw in the embodiment illustrated, although it could be the left-hand jaw or each if desired). Normally, the pawl stands clear of the teeth on the jaw so that the latter is free to move toward the opposed jaw until it is arrested by contact with the composed line positioned between them, whereupon the pawl, by the forward movement of the mold disk, is located in the path of the jaw teeth, some one of which (depending upon the length of the composed line) will bank against the pawl as the jaw is moved outwardly for the justification of the line. Since the pawl has a set position, the extent of jaw separation is definitely and predeterminately limited, the line in effect being expanded between two fixed abutments. In this way, the length of the line is positively determined and the fixed indenture secured.

The distance between the active faces of a pair of adjacent teeth on the jaw is preferably (although not necessarily) three ems and constitutes the range of expansibility of the line when the pawl is in action. It is a simple matter for an operator to compose a line within three ems of its desired length, this in fact being usually the maximum tolerance allowed in composing full measure 30 em lines. Actually in composing shorter lines, less tolerance is allowed. Consequently, the three-em spacing of the teeth will permit line indentures in multiples of three ems without any change of setting of the pawl, i. e., line indentures of 3 ems, 6 ems, 9 ems, etc. It is proposed, however, to provide for intermediate indentures by varying the setting of the pawl, either in relatively large increments of a half em or in smaller increments of a quarter point, it being understood that twelve points in the printer's measure equal one em. Thus, it will be seen that the combination of the adjustable pawl and the fixedly spaced teeth on the jaw will give any line indenture desired in multiples of a quarter of a point (or one twelfth of an em), which is obviously sufficient for all practical purposes.

Referring to the drawings:

Fig. 1 is a perspective view of a portion of a "Linotype" machine equipped with the present improvements;

Fig. 2 is a vertical section through the device illustrated in Fig. 1, and showing the location of the parts when the locking pawl is in active position;

Fig. 3 is a view similar to Fig. 2, but showing the location of the parts when the pawl is in inactive position;

Fig. 4 is an inside face view of the adjusting knob by means of which the smaller increments of adjustment of the pawl are effected;

Fig. 5 is a developed edge elevation of the knob shown in Fig. 4;

Fig. 6 is a vertical longitudinal sectional view taken through the pawl adjusting mechanism, illustrating in detail the mechanism for effecting the larger increments of adjustment of the pawl; and Figs. 7 to 12 are diagrammatic views, illustrating the various settings of the pawl and of the line clamping jaws for various line indentures.

The matrices and the expansible spacebands after being composed in line in the usual way are transferred to a vertically movable transporter which immediately descends to position the line between the left-hand jaw L and the right-hand jaw A (see Figs. 1 and 7) and in front of a slotted mold (not shown) carried by the mold disk B, whereupon the latter advances from the rear to bring the mold into contact with the line and the two line clamping jaws for the slug casting operation. Thereafter, the composed line is justified, which means that the wedge-shaped spacebands are forced upwardly to spread the line out the full distance between the line clamping jaws. Later, a pot C, which contains the molten metal from which the slugs are cast, is moved forwardly to close the mold at the rear and the metal then pumped into the mold. After the casting operation, the metal pot and the mold disk are retracted, the slug ejected from the mold, and the composed line carried upward by the first elevator for distribution of the matrices and spacebands.

The right hand jaw A is mounted for quadding movement in the vise frame D in the customary manner, being carried by a supporting block $A^1$ slidable in suitable guideways $D^1$ in the vise frame and movable toward and from the opposed jaw, all as fully disclosed in the Frolander Patent No. 1,971,400, reference to which may be had.

Located at the top of the supporting block $A^1$ and extending longitudinally of the jaw A (see Figs. 1, 2 and 3) is a bar $A^2$ formed at the bottom with a pair of depending lugs $A^3$, by means of which it is secured to the block, and at the top with a series of jaw locating stops or teeth $A^4$ spaced equally along the bar at three em intervals.

Above the bar $A^2$ and in close proximity thereto, is a banking pawl or element E formed at its left end with a depending nose portion $E^1$ adapted to cooperate with the teeth $A^4$ on the bar $A^2$. Normally the pawl E stands to the rear of the teeth $A^4$ (see Fig. 3), but after the jaw A has been moved inwardly to effect quadding of the line, the pawl is swung laterally forward (see Fig. 2) to a position wherein its nose portion $E^1$ will stand in the path of one of the teeth $A^4$, it being understood for the moment that this takes place prior to the justification or expansion of the line. Now, when the jaw A is backed off to permit the justification of the line by the expansion of the wedge-shaped spacebands, the jaw will be arrested by the banking of one of the teeth $A^4$ (the active one being automatically selected by the quadding movement of the jaw) against the nose portion $E^1$ of the pawl E and, since the position of the pawl will always be fixed, the location of the jaw will likewise be definitely determined. As mentioned before, the teeth $A^4$ are spaced along the bar $A^2$ at intervals of three ems, so that for a zero setting of the pawl $E^1$, fixed indentures at the ends of the composed lines in multiples of three ems can be obtained without altering the setting of the pawl.

The pawl E, in order that it may be swung laterally into and out of active position, is mounted on an overhead parallel rock shaft F journalled at one end in a bracket G fixed on the vise frame, as at $F^1$, and journalled at the other end in a bushing $G^1$ threaded through the other end of said bracket, the rock shaft at the latter end having a reduced portion $F^2$ so as to present a shoulder $F^3$ bearing against the adjacent end of the bushing. A pin $g$ fixed to the bushing and extending into an annular recess $g^1$ formed in the reduced portion of the rock shaft insures that the longitudinal relation between the bushing and the shaft will be maintained at all times.

The means for mounting the pawl E on the shaft F includes a block $E^2$ through which the shaft F extends and to the bottom of which the pawl is secured, the pawl at its right end terminating in a flat portion $E^3$ to provide a good bearing surface. The shaft F is constrained to rock with the pawl E by means of a stud $E^4$ extending upwardly through the base of the block $E^2$, wherein it is held by a transverse pin $e$ (see Fig. 3), and formed at its upper end with a feather $E^5$ engaging in a longitudinal keyway $F^4$ in the rock shaft, the keyway thus permitting longitudinal adjustment of the block $E^2$ along the rock shaft for a purpose which will presently appear.

Since fixed indentures at the ends of lines in multiples of three ems can be obtained through the medium of the toothed bar $A^2$ for one given location of the pawl E, it follows that by providing for the longitudinal adjustment of the pawl itself within a range of three ems, substantially any indenture at the end of a line can be obtained. To this end, the block $E^2$ which carries the pawl E is adjustable longitudinally of the rock shaft F to different positions as determined by a series of annular grooves or teeth $F^5$ formed in the shaft and with which there is arranged to mesh a series of complementary teeth $E^6$ formed at the lower end of a vertically movable plunger $E^7$ arranged in said block. When the teeth on the plunger are in mesh with the complementary teeth in the shaft, the position of the pawl E is fixed, but this position can be varied by disengaging the plunger $E^7$ from the shaft, and after moving the block (and consequently the pawl) longitudinally of the shaft to the desired extent, reengaging the plunger with the shaft. The pawl E has a range of adjustment of three ems along the shaft and, as the teeth $F^5$ on the shaft are spaced at intervals of a half em, corresponding multiples of line indenture may be obtained through the medium of this adjustment.

The plunger $E^7$ is engaged with and disengaged from the shaft F by means of a small rocker arm $E^8$ pivotally mounted adjacent its center in the block $E^2$ and extending at one end into a slot $E^9$ formed in the plunger at the top (see Figs. 3 and 6), at which end the rocker arm is bifurcated to straddle a pin $E^{10}$ extending transversely across the slot. At its other end, the rocker arm $E^8$ is pivotally connected to a vertically movable push button $E^{11}$ arranged in a recess drilled in the top of the block $E^2$ and constantly urged upward by a compression spring $E^{12}$ located thereunder and which acts through the parts just described to hold the plunger $E^7$ in engagement with the rock shaft. According to this arrangement, the pawl E may be given any desired half em setting (within the three em range) merely by pressing down on the button $E^{11}$ to disengage the plunger $E^7$ from the rock shaft, moving the block $E^2$ which supports the pawl to the desired position along the shaft F, and then releasing the button to permit the parts to reengage. The different positions of the pawl E are indicated by a scale H fixed at the front of the shaft supporting bracket G and having half em graduations adapted to be read in conjunction with a reference line on the block $E^2$ at the front, it being noted that the block at this portion has a curved surface $E^{13}$ concentric with the rock shaft so that said surface will always be in proximity to the scale regardless of the position of the block (see Figs. 1 and 3).

Still finer adjustments in the setting of the pawl E may be obtained by moving the rock shaft F longitudinally in the bracket G, this being effected through the adjustment of the threaded bushing $G^1$ in which the shaft F is journalled at the right. For this purpose, the bushing is provided with a knob J mounted on a reduced outer portion $G^2$ thereof and held in fixed relation therewith by a set screw $J^1$ threaded through the knob and engaging in an annular recess $G^3$ in said reduced portion. The pitch of the thread on the bushing is such that one complete turn of the knob will adjust the rock shaft F (and consequently the pawl E) endwise a distance of a quarter em and partial turns of the knob proportionate amounts. The partial adjustments of the knob, which as shown in Figs. 4 and 5 are in increments of quarter points, are determined by a spring-pressed detent $J^2$ in the bracket G (Fig. 6) arranged to engage in one or another of a series of recesses $J^3$ equally spaced on a common pitch circle around the inner face of the knob (Fig. 4). The distance between adjacent recesses corresponds to the one quarter point adjustment in the position of the pawl E, previously alluded to. The various positions of the knob J are indicated by a scale $J^4$ arranged circumferentially around the knob and having one quarter point graduations adapted to be read in conjunction with a reference mark scored in the bracket G (see Fig. 1). The knob scale developed in edge elevation is shown clearly in Fig. 5.

It will now be seen that any line indenture desired in multiples of a quarter point can be obtained with the present improvements: first, by the adjustment of the rock shaft F longitudinally through the manipulation of the knob J providing adjustments through a range of a half em in increments of a quarter point; second, by the adjustment of the pawl along the rock shaft providing adjustments through a range of three ems in increments of a half em; and third, by the quadding movement of the jaw itself, the series of teeth on which give adjustments up to twenty-four ems in increments of three ems, it being unnecessary to make provision for lines of less than six ems in length.

The rocking of the pawl E into and out of active position is effected through the advance and the return movement of the mold disk B. The mechanism for this purpose (see Figs. 1, 2 and 3) includes in part a pair of slides K and $K^1$, one telescoping within the other and arranged above the vise jaw for movement in a fore-and-aft direction in guideways presented by the fixed bracket G. The slide K at the front is provided with a pair of depending fingers $K^2$ (Figs. 1 and 2) straddling the pawl E at the top of its central portion, which latter incidentally is below the axis of the rock shaft F on which the pawl is supported and which is somewhat wider than the left end portion carrying the nose $E^1$. The inner faces of the fingers $K^2$, as shown in Fig. 2, flare outwardly to accommodate the pawl E in its different positions of adjustment.

When the mold disk B is in its normal retracted position (Fig. 3), the pawl E is held out of the path of the jaw teeth $A^4$ by a relatively light spring $K^3$ (Fig. 2) housed in a recess $G^4$ formed in the front of the bracket G and which presses against the front depending finger $K^2$, thus urging the front slide K to its rearmost position. The rear slide $K^1$ into which the front slide K telescopes is likewise urged to its rearmost position by a compression spring $K^4$ (see also Fig. 1) reacting against the rear end of the front slide K and the rear end of the slot in the rear member $K^1$ into which the front member telescopes.

It will be borne in mind that immediately after the composed line is presented in front of the mold, the jaw A at the right (assuming that the machine is set for quadding right) is moved inwardly until it is arrested by contact with the line, and that thereafter the slotted mold through the forward movement of the mold disk B is brought into contact with the line prior to the justification of the line. In the present embodiment of the invention, the mold disk, during its forward movement, is made to engage a finger $K^5$ depending from the rear slide $K^1$ and push the latter forwardly, the slide $K^1$ in turn, through the medium of the compression spring $K^4$, acting to press the front slide K forwardly until the latter banks at its front end against a portion of the fixed bracket G (see Figs. 1 and 2), it being understood that the larger spring $K^4$ is strong enough to overcome the force exerted by the smaller spring $K^3$. As the slide moves forwardly, it will turn the pawl E from its inactive position shown in Fig. 3 to its active position shown in Fig. 2. Justification of the line follows, at which time the right-hand jaw A will be located in proper line justifying position by the banking of the active one of the teeth $A^4$ against the nose $E^1$ of the pawl.

It is possible, of course, that the nose portion $E^1$ of the pawl E, as the latter swings towards its active position, will strike against the lateral face of one of the teeth $A^4$, as when the length of the composed line is such as to arrest the jaw in a position to do this, but no damage can result because of the cushioning action of the spring $K^4$. Furthermore, as the jaw A is backed up for the justification of the line, the interfering tooth will merely move to the right of the pawl nose $E^1$ and allow the latter to spring forwardly to its active position into the path of the next adjacent tooth at the left, so that the jaw will be arrested in the manner previously described. It is only necessary that the operator compose each line within a range of three ems short of its required length which, as before explained, is common practice.

After the slug casting operation has been completed and as the mold disk recedes, the rear slide $K^1$ is positively moved rearwardly by the engagement of the rear face of the mold disk against the downwardly extending portion $K^6$ of a right angle arm $K^7$ pivotally mounted adjacent the end of slide $K^1$. The normal position of the arm $K^7$ is such that its depending portion $K^6$ stands clear of the mold disk (see Fig. 1) so as not to interfere with the opening of the vise frame when the latter operation is desired for inspection or adjustment of the parts. This normal position of the arm is determined by the banking of a lug $K^8$ formed on said arm against a fixed stop $K^9$ formed on the slide $K^1$ and is maintained by a compression spring $k^8$ seated at its opposite ends in opposed holes formed in the adjacent bottom and top faces of the arm $K^7$ and the slide $K^1$, respectively. However, when the slide $K^1$ is moved forwardly in the manner previously described, another upstanding lug $K^{10}$, formed at the front end of the arm $K^7$ immediately above its pivot point, will bank against a stop $K^{11}$ mounted on the fixed bracket G and, as it does so, the arm will be turned against the tension of the spring $k^8$ to the position shown in Fig. 2. Later, when the metal pot moves forwardly into contact with the mold, an arm $C^1$ fixed thereto will override an abutment $K^{12}$ located at the rear of the arm $K^7$ and hold the latter with its depending arm $K^6$ in position to be engaged by the mold disk as the latter moves rearwardly after the casting operation, thus effecting the positive rearward movement of the slide $K^1$. As the slide $K^1$ moves rearwardly, the pressure on the spring $K^4$ is relieved and the small spring $K^3$ will move the front slide K rearwardly too, thereby restoring the pawl E to its normal inactive position. Thereafter, the right-hand jaw A, now being free, is returned to its normal position of maximum separation in the usual way. The normal or inactive position of the pawl E is determined by the banking of a shoulder E¹⁴, presented at the front of the block E² just beneath the curved portion E¹³ thereof, against a part of the fixed bracket G (Fig. 3).

In order to insure that the arm C¹ on the metal pot C will properly override the abutment K¹² on the pivotally mounted arm K⁷, the stop K¹¹ is made adjustable to insure that the arm will assume a horizontal position when active, and moreover the abutment K¹² itself is made adjustable, being presented by a member K¹³ adjustable vertically in the depending portion K⁶ by a set screw K¹⁴ and locked in its adjusted position by a clamping screw K¹⁵ (Fig. 2). The arm K⁷ is held in its downward position by the pot arm C¹ throughout the pawl disengaging movement of the slide K¹, i. e., until after the mold disk has fully returned to its retracted position. Thereafter the metal pot C breaks away from the mold, and then the arm C¹ will ride off the abutment K¹², allowing the arm K⁷ to be returned by the spring k⁸ to its normal raised position clear of the mold disk, it being noted that the front end of the arm C¹ is inclined so as to permit the upward movement of the pivotally mounted arm K⁷ to be effected gradually. The relative position of the parts just at the end of the rearward movement of the mold disk is shown by the dot-and-dash lines in Fig. 3, while the normal relative positions thereof, i. e., when the metal pot is fully retracted, are shown by the solid lines. As a safety measure and to prevent the entrance of dust and dirt which would be detrimental to the operation of the parts, the telescoping slide members K and K¹ are covered by a plate M (see Fig. 1) screwed to the fixed bracket G.

A clear conception of the operation of the device may be had by referring to Figs. 7 to 12, inclusive. In Fig. 7 the line to be cast is of full measure, i. e., 30 ems in length, it being understood that in this and the other examples alluded to, the machine is set for quadding with the right-hand jaw. Here the index mark on the pawl carrying member E² is set in the zero position on the scale H, hence as long as the line as composed is between 27 ems and 30 ems in length, it will be justified to its full 30 em measure, since the first tooth A⁴ at the left on the jaw A will, during the outward movement of the jaw, bank against the pawl E which, being in zero position, will permit of the maximum jaw separation.

If a one em indenture is desired at the right end of the line (see Fig. 8), the index mark on the pawl carrying member E² is set opposite graduation 1 on the scale H. In other words, the pawl is now located one em to the left of its zero position and if, as before, the line is composed within three ems of its desired length (which in this case is 29 ems), the first tooth A⁴ at the left will bank against the pawl E during the outward movement of the jaw but, since the pawl is now located in a position one em to the left of its zero position, an indenture of one em at the right end of the line will be produced. Similarly, if a two em indenture is desired (see Fig. 9), the index mark on the pawl carrying member is set opposite graduation 2 on the scale, the line in this case being 28 ems in length.

A setting of the parts to obtain an indenture of 15 ems is illustrated in Fig. 10. Since 15 ems is a multiple of 3, the index mark on the pawl carrying member is again set at zero and, by composing the line within a range allowing for normal expansion of the spacebands in the line (normally about one and one half ems for a 15 em line), the right-hand jaw when arrested by contact with the composed line will automatically present the sixth tooth from the left (i. e., five teeth beyond the first tooth which is active for a full measure 30 em line) in position to bank against the pawl E during the outward movement of the jaw, thereby producing the desired 15 em indenture. For indentures of 16 ems and 17 ems (see Figs. 11 and 12), corresponding to lines 14 ems and 13 ems in length, respectively, the same tooth is effective as in the case of 15 em indenture, but the pawl E is set over to the left, in one case one em from zero position, and in the other case two ems from zero position.

Attention might be called to the fact that for lines 27 ems in length (as well as those of less length), the same 3 em indenture could be obtained by setting the index mark either at zero or at 3 on the scale H, whichever is most convenient, although the tooth which will be active for the 3 em setting is the one to the left of that which will be active for the zero setting, since the total amount of an indenture is the sum of the setting indicated by the scale H added to the number of increments through which the jaw has moved as represented by the teeth A⁴ thereon, not counting, of course, the first tooth at the left.

From what has been said, it is hardly thought necessary to give a detailed analysis of the indentures obtainable through the manipulation of the knob J, it being recalled that the turning of this knob likewise effects a change in position of the pawl E but in smaller increments of one quarter point.

In the Frolander patent before referred to, the right hand jaw, after being arrested in its inward movement by contact with the composed line, is later moved outwardly to its final quadding position by mechanism acting independently of the line rather than through the line. In other machines (see for instance, the earlier Frolander Patent No. 1,949,302), the outward movement of the jaw to its final quadding position is effected by the line itself as it is expanded by the upward thrust of the spacebands. It will be understood that this invention is applicable to either type of machine, it being directed to the means shown and described for arresting the jaw in its outward movement, however produced, to locate it in a definite predetermined line justifying position according to the fixed indenture desired. In either machine, if the composed line does not contain sufficient spacebands to expand the line to its proper justified length, the automatic pump stop comes into play and prevents casting.

In the accompanying drawings, the invention has been shown merely in preferred form and by way of example, but obviously many changes and variations may be made therein without departing from its spirit. It should be understood, therefore, that the invention is not limited to any specific form or embodiment except insofar as such limitations are specified in the appended claims.

Having thus described my invention, what I claim is:

1. A slug casting machine including, in combination, a pair of line clamping jaws, one movable toward and from the other to quad out a short line of matrices and expansible spacebands positioned between them, a banking element, and a plurality of spaced stops associated with said jaw and adapted selectively to cooperate with said banking element and arrest the jaw in its outward movement in different predetermined line justifying positions, said stops being selectable each by lines varying in length within a range allowing for normal expansion of the spacebands in the line.

2. A slug casting machine including, in combination, a pair of line clamping jaws, one movable toward and from the other to quad out a short line of matrices and expansible spacebands positioned between them, a banking element, a plurality of spaced stops associated with said jaw and adapted selectively to cooperate with said banking element and arrest the jaw in its outward movement in different predetermined line justifying positions, said stops allowing for the casting of lines varying by given increments of length, and means for adjusting the banking element to allow for the casting of lines varying by other increments of length.

3. A slug casting machine including, in combination, a pair of line clamping jaws, one movable toward and from the other to quad out a short line of matrices and expansible spacebands positioned between them, a banking element adjustable within a given range, a plurality of spaced stops associated with said jaw and adapted selectively to cooperate with said banking element and arrest the jaw in its outward movement in different predetermined line justifying positions, said stops being selectable each by lines varying in length within the range of adjustment of the banking element.

4. A slug casting machine including, in combination, a pair of line clamping jaws, one movable inwardly until arrested by a line of matrices and expansible spacebands positioned between them and then movable outwardly to final quadding position, a banking element located normally in an inactive position, a plurality of spaced stops associated with said jaw and movable therewith, and means acting after the inward movement of the jaw for locating the banking element in active position to cooperate with one or another of said stops and arrest the jaw in its outward movement in a predetermined line justifying position.

5. A combination according to claim 4, wherein the means for moving the banking element to active position includes a periodically operated part of the machine.

6. A combination according to claim 4, wherein the means for moving the banking element to active position includes the mold disk.

7. A slug casting machine including, in combination, a pair of line clamping jaws, one movable inwardly until arrested by a line of matrices and expansible spacebands positioned between them and then movable outwardly to final quadding position, a banking element located normally in an inactive position, a plurality of spaced stops associated with said jaw and movable therewith, means acting after the inward movement of the jaw for locating the banking element in active position to cooperate with one or another of said stops and arrest the jaw in its outward movement in a predetermined line justifying position, and means for setting the banking element in different jaw arresting positions.

8. A slug casting machine including, in combination, a pair of line clamping jaws, one movable inwardly until arrested by a line of matrices and expansible spacebands positioned between them and then movable outwardly to final quadding position, a pivotally mounted normally inactive banking pawl disposed longitudinally of the jaw, spaced teeth on the jaw adapted to cooperate with said pawl when active for limiting the outward movement of the jaw, a parallel shaft on which the pawl is mounted, means for adjusting the pawl along the shaft, and means for moving the pawl into and out of active position.

9. A slug casting machine including, in combination, a pair of line clamping jaws, one movable inwardly until arrested by a line of matrices and expansible spacebands positioned between them and then movable outwardly to final quadding position, a pivotally mounted normally inactive banking pawl disposed longitudinally of the jaw, and spaced teeth on the jaw adapted to cooperate with said pawl when active for limiting the outward movement of the jaw, a parallel shaft on which the pawl is mounted, means for moving the pawl relatively to the shaft to effect certain adjustments of the pawl, means for moving the shaft and pawl as a unit to effect other adjustments of the pawl, and means for moving the pawl into and out of active position.

10. A slug casting machine including, in combination, a pair of line clamping jaws, one movable inwardly until arrested by a line of matrices and expansible spacebands positioned between them and then movable outwardly to final quadding position, a pivotally mounted normally inactive banking pawl disposed longitudinally of the jaw, spaced teeth on the jaw adapted to cooperate with said pawl when active for limiting the outward movement of the jaw, a shaft extending parallel to the pawl, a pawl carrying member mounted on the shaft, said shaft and member being provided with interengaging elements for locking them against relative movement, means for unlocking said shaft and member to permit relative adjustment, and means for moving the pawl into and out of active position.

11. A combination according to claim 10, wherein the interengaging elements provided for the shaft and pawl carrying member determine definite increments of adjustment for the pawl.

12. A slug casting machine including, in combination, a pair of line clamping jaws, one movable inwardly until arrested by a line of matrices and expansible spacebands positioned between them and then movable outwardly to final quadding position, a pivotally mounted normally inactive banking pawl disposed longitudinally of the jaw, spaced teeth on the jaw adapted to cooperate with said pawl when active for limiting the outward movement of the jaw, a parallel shaft on which the pawl is mounted, means for adjusting the pawl and shaft as a unit, and means for moving the pawl into and out of active position.

13. A slug casting machine including, in combination, a pair of line clamping jaws, one movable inwardly until arrested by a line of matrices and expansible spacebands positioned between them and then movable outwardly to final quadding position, a pivotally mounted normally inactive banking pawl disposed longitudinally of the jaw, spaced teeth on the jaw adapted to cooperate with said pawl when active for limiting the outward movement of the jaw, a parallel shaft on which the pawl is mounted, means for adjusting the pawl and shaft as a unit including screw devices, means for indicating the extent of such adjustment, and means for moving the pawl into and out of active position.

14. A slug casting machine including, in combination, a pair of line clamping jaws, one movable inwardly until arrested by a line of matrices and expansible spacebands positioned between them and then movable outwardly to final quadding position, a pivotally mounted normally inactive banking pawl disposed longitudinally of the jaw, spaced teeth on the jaw adapted to cooperate with said pawl when active for limiting the outward movement of the jaw, a shaft extending parallel to the pawl, a pawl carrying member mounted on the shaft, said shaft and member being provided with interengaging elements for locking them against relative movement, means for unlocking said shaft and member to permit relative adjustment, said interengaging elements providing definite increments of adjustment for the pawl, means for adjusting the pawl carrying member and the shaft as a unit to effect other increments of adjustment for the pawl, and means for moving the pawl into and out of active position.

15. A slug casting machine including, in combination, a pair of line clamping jaws, one movable toward and from the other to quad out a short line of matrices and spacebands positioned between them, a pivotally mounted normally inactive banking pawl, a plurality of spaced teeth associated with said jaw and adapted selectively to cooperate with said pawl to arrest the jaw in its outward movement in different predetermined line justifying positions, and means acting resiliently to move said pawl into active position.

16. A slug casting machine including, in combination, a pair of line clamping jaws, one movable toward and from the other to quad out a short line of matrices and spacebands positioned between them, a pivotally mounted normally inactive banking pawl, a plurality of spaced teeth associated with said jaw and adapted selectively to cooperate with said pawl to arrest the jaw in its outward movement in different predetermined line justifying positions, and means including a pair of telescoping members, with intermediate resilient means for transmitting force between them, for moving said pawl into active position.

17. A combination according to claim 15, wherein resilient means are also provided for moving the pawl out of active position.

18. A combination according to claim 15, wherein the means for moving the pawl into active position includes the mold disk.

19. A slug casting machine including, in combination, a pair of line clamping jaws, the right-hand jaw being movable toward and from the left hand jaw to quad out a short line of matrices and spacebands positioned between them, a banking pawl, and spaced teeth on the jaw adapted to cooperate one or another, depending upon the length of the line, with said pawl to limit the outward movement of the jaw, said teeth being spaced at intervals of 3 ems whereby to obtain indentures at the ends of lines in increments of three ems.

20. A slug casting machine including, in combination, a pair of line clamping jaws, the right-hand jaw being movable toward and from the left-hand jaw to quad out a short line of matrices and spacebands positioned between them, a banking pawl, and spaced teeth on the jaw adapted to cooperate one or another, depending upon the length of the line, with said pawl to limit the outward movement of the jaw, said teeth being spaced at intervals of 3 ems and said pawl being adjustable within a range of three ems whereby various indentures at the ends of lines in different selected increments can be obtained.

21. A slug casting machine including, in combination, a pair of line clamping jaws, one movable relatively to the other for quadding, and means acting automatically to locate the quadding jaw in one or another of a series of fixed predetermined line justifying positions dependent upon the length of the composed line when composed within a given range of its final justified length.

22. A slug casting machine including, in combination, a pair of line clamping jaws, one movable relatively to the other for quadding, means acting automatically to locate the quadding jaw in one or another of a series of fixed predetermined line justifying positions dependent upon the length of the composed line when composed within a given range of its final justified length, and means for altering the setting of the automatic means to correspondingly alter the line justifying positions of the quadding jaw.

23. A slug casting machine including, in combination, a pair of line clamping jaws, one movable relatively to the other for quadding, and means acting automatically to locate the quadding jaw in one or another of a series of fixed predetermined line justifying positions dependent upon the length of the composed line when composed within a given range of its final justified length, said line justifying positions varying in given multiples of an em under a given setting of the automatic means.

24. A slug casting machine including, in combination, a pair of line clamping jaws, one movable relatively to the other for quadding, means acting automatically to locate the quadding jaw in one or another of a series of fixed predetermined line justifying positions dependent upon the length of the composed line when composed within a given range of its final justified length, said line justifying positions varying in given multiples of an em under a given setting of the automatic means, and means for altering the setting of the automatic means to vary the line justifying positions of the quadding jaw in fractional parts of an em.

25. A slug casting machine including, in combination, a pair of line clamping jaws, one movable relatively to the other for quadding, a banking element arranged to cooperate with the jaw and hold it in a definite predetermined line justifying position, and means for moving the banking element to and from active position, said means being actuated by the forward and backward movement of the mold disc.

26. A combination according to claim 16, wherein resilient means are also provided for moving the pawl out of active position.

27. A combination according to claim 16, wherein the means for moving the pawl into active position includes the mold disc.

28. A slug casting machine including, in combination, a pair of line clamping jaws, one movable inwardly until arrested by a line of matrices and expansible spacebands positioned between them and then movable outwardly to final quadding position, a pivotally mounted normally inactive banking pawl disposed longitudinally of the jaw, spaced teeth associated with the jaw adapted to cooperate with said pawl when active for limiting the outward movement of the jaw, a parallel shaft on which the pawl is mounted, means for adjusting the pawl along the shaft, and means for moving the pawl into and out of active position.

29. A slug casting machine including, in combination, a pair of line clamping jaws, one movable inwardly until arrested by a line of matrices and expansible spacebands between them and then movable outwardly to final quadding position, a pivotally mounted normally inactive banking pawl disposed longitudinally of the jaw, spaced teeth associated with the jaw adapted to cooperate with said pawl when active for limiting the outward movement of the jaw, a parallel shaft on which the pawl is mounted, means for adjusting the pawl and shaft as a unit, and means for moving the pawl into and out of active position.

30. A slug casting machine including, in combination, a pair of line clamping jaws, one movable toward and from the other to quad out a short line of matrices and spacebands positioned between them, an adjustable banking stop, a plurality of spaced teeth associated with the jaw and adapted selectively to cooperate with the stop to arrest the jaw in its outward movement in different predetermined line justifying positions, said teeth being selectable each by lines varying in length within a range allowing for normal expansion of the spacebands in the line, and means for adjusting the banking stop to a plurality of different operative positions with reference to the jaw teeth.

31. A slug casting machine including, in combination, a pair of line clamping jaws, one movable toward and from the other to quad out a short line of matrices and spacebands positioned between them, an adjustable banking stop, a plurality of spaced teeth associated with the jaw and adapted selectively to cooperate with the stop to arrest the jaw in its outward movement in different predetermined line justifying positions for a given setting of the stop, means for adjusting the stop to a series of different settings, and supplemental means for adjusting the stop to other different intermediate settings.

32. A slug casting machine including, in combination, a pair of line clamping jaws, one movable toward and from the other to quad out a short line of matrices and spacebands positioned between them, an adjustable banking stop, a plurality of spaced teeth associated with the jaw and adapted selectively to cooperate with the stop to arrest the jaw in its outward movement in different predetermined line justifying positions for a given setting of the stop, mounting means for the stop including a block and a shaft on which the block is mounted, said block being adjustable with respect to the shaft for certain settings of the stop, and means for adjusting the shaft for other settings of the stop.

RICHARD R. MEAD.